(12) United States Patent
Wood, Jr. et al.

(10) Patent No.: US 7,568,841 B2
(45) Date of Patent: Aug. 4, 2009

(54) BALL END FOR A LINK

(75) Inventors: Robert Lee Wood, Jr., Waterloo, IA (US); Michael Dean Kollath, Dunkerton, IA (US)

(73) Assignee: Deere & Company, Moline, IL (US)

( * ) Notice: Subject to any disclaimer, the term of this patent is extended or adjusted under 35 U.S.C. 154(b) by 827 days.

(21) Appl. No.: 11/183,509

(22) Filed: Jul. 18, 2005

(65) Prior Publication Data
US 2007/0014497 A1    Jan. 18, 2007

(51) Int. Cl.
*F16C 23/04*    (2006.01)
(52) U.S. Cl. .................. 384/209; 384/206; 384/208; 403/122; 403/135; 172/439
(58) Field of Classification Search .................. 384/206, 384/208, 209, 210, 192; 403/122, 135; 172/439
See application file for complete search history.

(56) References Cited
U.S. PATENT DOCUMENTS

| | | | |
|---|---|---|---|
| 3,151,882 A * | 10/1964 | Foxwell et al. .............. 172/439 |
| 3,160,449 A | 12/1964 | Scott ........................... 308/72 |
| 3,493,252 A | 2/1970 | Watson et al. .................. 287/88 |
| 3,589,779 A * | 6/1971 | Sokol ........................ 384/208 |
| 3,876,232 A | 4/1975 | Pertusi .................... 280/415 A |
| 4,174,137 A | 11/1979 | Ferris ........................ 308/72 |
| 4,248,486 A | 2/1981 | Bradley, Jr. .................. 308/72 |
| 4,251,122 A | 2/1981 | McCloskey .................. 308/72 |
| 4,466,631 A | 8/1984 | Berg ...................... 280/415 A |
| 5,005,991 A | 4/1991 | Heumann et al. ........... 384/208 |
| 5,524,987 A | 6/1996 | Vigeh .......................... 384/209 |
| 6,520,682 B2 | 2/2003 | Kletzli et al. ............... 384/210 |

* cited by examiner

*Primary Examiner*—William C Joyce

(57) ABSTRACT

A ball/socket link end assembly includes a link opening formed in the link end. A portion of the opening forms a spherical inner surface. A pair of ball entry slots are formed in the link end. The slots are spaced apart and positioned on opposite sides of the opening, and extend only part way into the link end from one side thereof. The assembly also includes a removable truncated ball member with a spherical perimeter which matches the spherical inner surface. A clamp member is attachable to the link end. The clamp member is engagable with the ball to prevent removal of the ball from the link end when the ball is aligned with the entry slots. The clamp member is received in a recess formed in the link end adjacent to the opening.

5 Claims, 3 Drawing Sheets

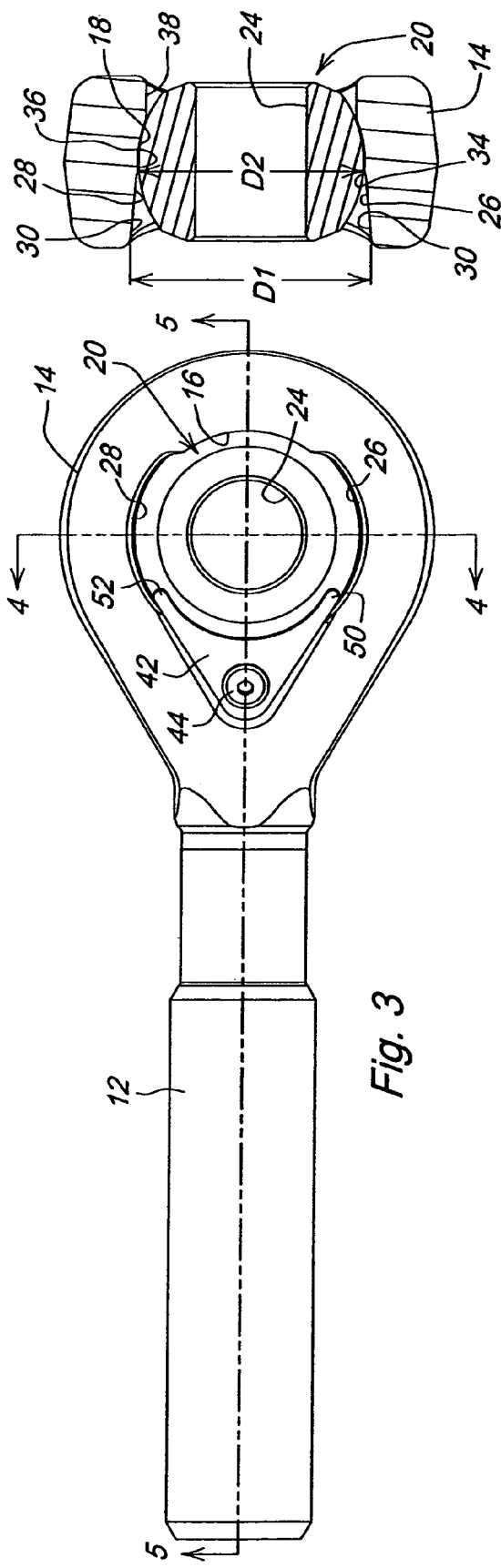
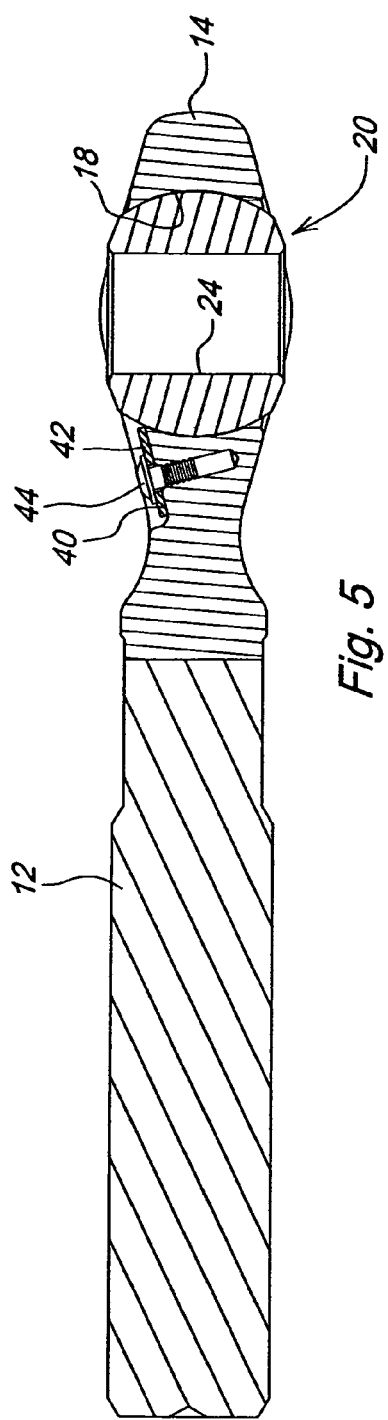
Fig. 3
Fig. 4
Fig. 5

BALL END FOR A LINK

BACKGROUND

The present invention relates to a high strength ball end for a link such as a hitch link for a three-point hitch.

A typical center link for a 3-point hitch includes ends in which a spherical bushing, or ball, is held captive within a socket. The ball has a central bore so that it can be coupled by a pin to either a tractor bracket or to an implement coupler. During normal operation, the ball rotates within the socket and can wear. If the wear progresses to the point where an undesirable amount of clearance exists between the ball and socket, then the ball or the entire end must be replaced.

In many ball end designs, this is not easily done, or possible. Many link ends have a ball that is installed in the socket and then the end is swaged or crimped down over part of the ball to capture it. The ball in this type of link cannot be replaced because the material of the end must be deformed significantly to remove the ball and may crack if this is attempted.

Another common ball end design uses a pressed-in retainer which captures the ball in the end. This design permits ball replacement if the proper equipment is available to remove the retainer and reinstall it. But often, the retainer is locked in place by crimping the end over it, which then prevents replacement of the ball. It would be desirable to have a link end design which permits replacement of only the ball, instead of a design which requires replacement of the entire link end.

A link end with a removable ball assembly is described in U.S. Pat. No. 6,520,682, issued to Deere & Company. In this design the ball is a two-piece ball and sleeve assembly. The sleeve prevents the ball from rotating to the position where it can be removed through the slot. When it becomes necessary to remove the ball, the sleeve is first removed from a bore through the ball and then the ball is rotated 90 degrees and removed through the slot in the link end. However, this design requires a two-piece ball and sleeve assembly, and thus requires that both parts be machined and hardened at additional cost. Also, in this design both the ball and sleeve must be relatively thin in cross-section. This makes them prone to high stresses and reduced life, and the ball and sleeve may crack and/or break before they wear out.

SUMMARY

Accordingly, an object of this invention is to provide a ball/socket link end which permits easy ball replacement.

A further object of the invention is to provide such a ball/socket link end which is compact.

These and other objects are achieved by the present invention, wherein a ball/socket link end includes a link opening which receives a removable truncated ball member with a spherical perimeter. The link opening has a spherical inner surface matching the spherical perimeter of the ball member. A pair of ball entry slots are formed in one side of the link end and are positioned on opposite sides of the opening and on opposite sides of a longitudinal link axis. The slots extend only part way into the link end from one side of the link end. When the ball is aligned with the slots, the ball may be inserted into and removed from the opening via the slots. A clamp recess is formed in the link end adjacent the opening. A clamp member is removably received by the recess. The clamp member has fingers which engages the ball and prevents removal of the ball when the ball is aligned with the entry slots.

With this design the ball can be a thicker, one-piece design that is still removable for service. A one-piece machined, heat treated ball reduces part costs and the thicker ball has improved durability. The clamp may be a simple sheet metal part which does not require any expensive materials or processes to produce. Service of the ball is easy, as removal and installation can be accomplished with a single wrench or similar tool. Removal of a snap ring with snap ring pliers is not required.

BRIEF DESCRIPTION OF THE DRAWINGS

FIG. 3 is side view of the ball/socket link end according to the present invention with the ball in its working position in the socket;

FIG. 4 is a view taken along lines 4-4 of FIG. 3; and

FIG. 5 is a view taken along lines 5-5 of FIG. 3.

DETAILED DESCRIPTION

Figure 1:
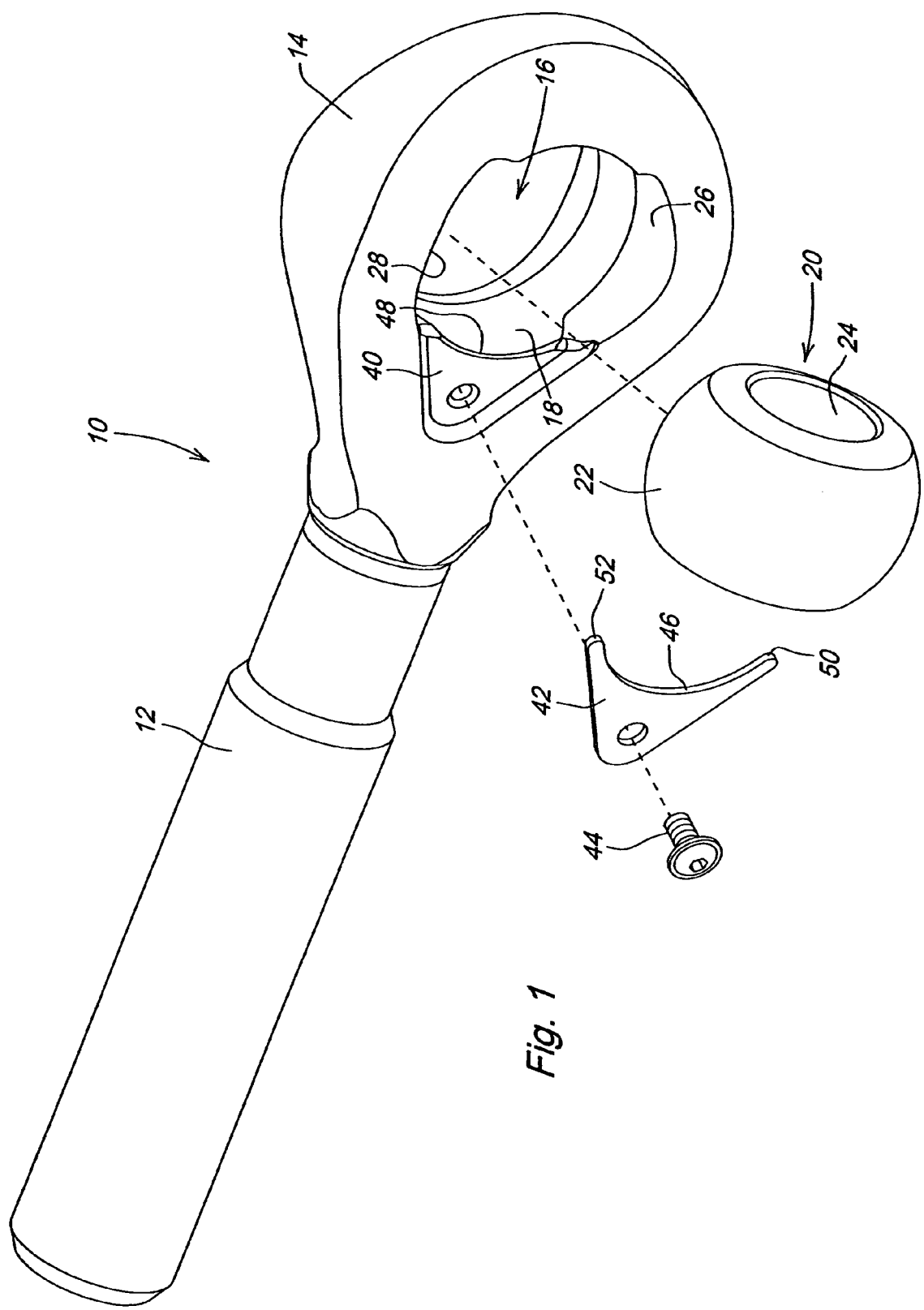
FIG. 1 is an exploded perspective view of a ball/socket link end assembly according to the present invention.

Referring to FIG. 1, the link end 10 includes a body or shaft 12 and an end 14 with a link opening 16. The end 14 has a spherical inner surface 18. A truncated ball member 20 has an spherical outer surface 22 which is commensurate with inner surface 18 and a central axial bore 24. The end 14 has a pair of entry slots 26, 28 which are located at opposite sides of the opening 16 and which have inner edges which merge with the inner surface 18. As best seen in FIG. 4, the slots 26 and 28 extend only from one side of inner surface 18 to one side of end 14. Also, as best seen in FIG. 4, the outer ends 30, 32 of slots 26, 28 are spaced farther apart from each other than are their inner ends 34, 36. In other words, the slot outer ends 30, 32 are separated by a first distance D1, and the inner ends 34, 36 are separated by a second distance D2, and first distance D1 is larger than the second distance D2. This slanted orientation of the slots 26, 28 assists in smooth insertion of the ball member 20 into the opening 16 into the position shown in FIG. 2. Furthermore, a cylindrical bore 38 extends from the opposite side of inner surface 18 to the other side of end 14. The diameter of bore 38 is preferably made small enough to prevent the ball from being removed from end via bore 38.

Referring again to FIG. 1, a clamp recess 40 is formed on one side of the end 14 adjacent the opening 16. Recess 40 receives a clamp 42 which is attached thereto by a bolt 44. Clamp 42 has a curved concave lip 46 which faces the opening and which extends slightly beyond edge 48 of opening 16. The clamp member 42 is attached to the link end 14 by a bolt 44 which is inserted through the clamp member 42 and into the link end 14.

The clamp 42 forms a pair of spaced apart fingers 50, 52 which extend over and cover a portion of the slots 26, 28.

Figure 2:
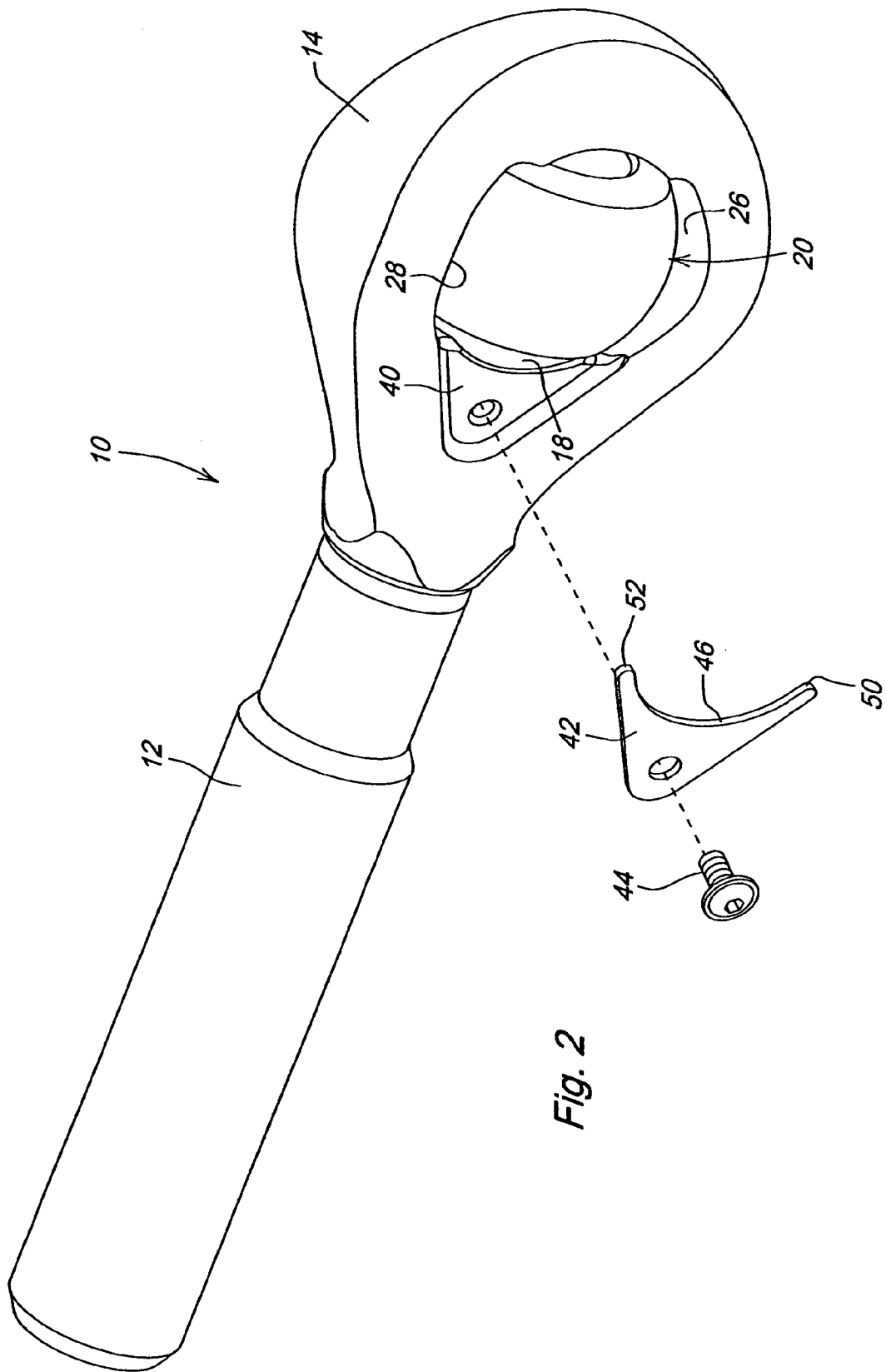
FIG. 2 is a view similar to the view of FIG. 1, but with the ball initially mounted in the socket.

The fingers 50, 52 are dimensioned so that they does not interfere with the normal rotation of the ball 20 within surface 18. However, when the ball is oriented or aligned with slots 26, 28 as shown in FIG. 2, the fingers 50, 52 will prevent removal of ball member 20 from the opening 16. Because the clamp 42 is recessed within recess 40, it does not increase the overall dimensions of the end 14, nor reduce its range of motion, nor interfere with other parts during normal operation.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. A ball/socket link end, comprising:

an elongated link member having a longitudinal axis, the link member having a link opening adjacent an end of the link, the opening having a central transverse axis which is oriented perpendicular with respect to the longitudinal axis;

a removable truncated ball member having a width defined by substantially flat opposing sides and having a spherical perimeter, and having a cylindrical bore extending therethrough substantially perpendicular to said opposing sides;

said link opening having a spherical inner surface matching the spherical perimeter of the ball member, said link opening having a pair of entry slots, said slots being spaced apart and positioned on opposite sides of said longitudinal axis, and said slots extending only part way into the link end in a direction parallel to said transverse axis, and said slots receiving the ball member when the ball member is oriented with its opposing sides parallel to said transverse axis; and a clamp member attachable to the link end to prevent removal of the ball member from the opening when the ball member is aligned with the entry slots, the clamp member being attached to the link end by a bolt which is inserted through the clamp member and into the link end.

2. The ball/socket link end of claim 1, wherein:

a clamp recess is formed in the link end adjacent the opening, and the clamp member being received by the clamp recess.

3. The ball/socket link end of claim 2, wherein:

the clamp has a concave curved edge which faces the opening.

4. The ball/socket link end of claim 1, wherein:

each slot includes an inner end and an outer end, the slot inner ends connecting to the inner spherical surface.

5. The ball/socket link end of claim 4, wherein:

the slot outer ends being separated by a first distance and the slot inner ends being separated by a second distance, the first distance being larger than the second distance.

* * * * *